A. B. LANDIS.
GRINDING MACHINE.
APPLICATION FILED APR. 26, 1906.
1,018,392.
Patented Feb. 20, 1912.
9 SHEETS—SHEET 6.
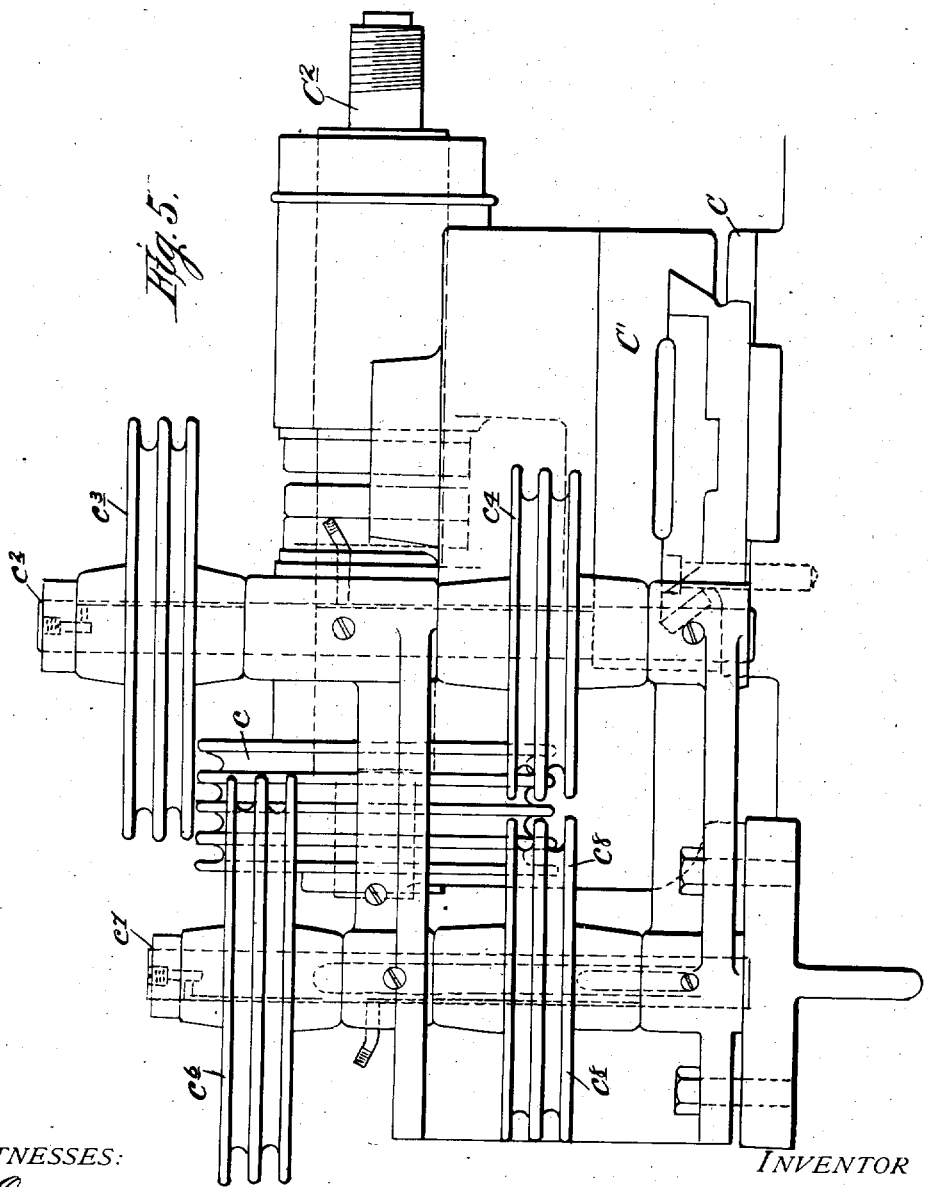

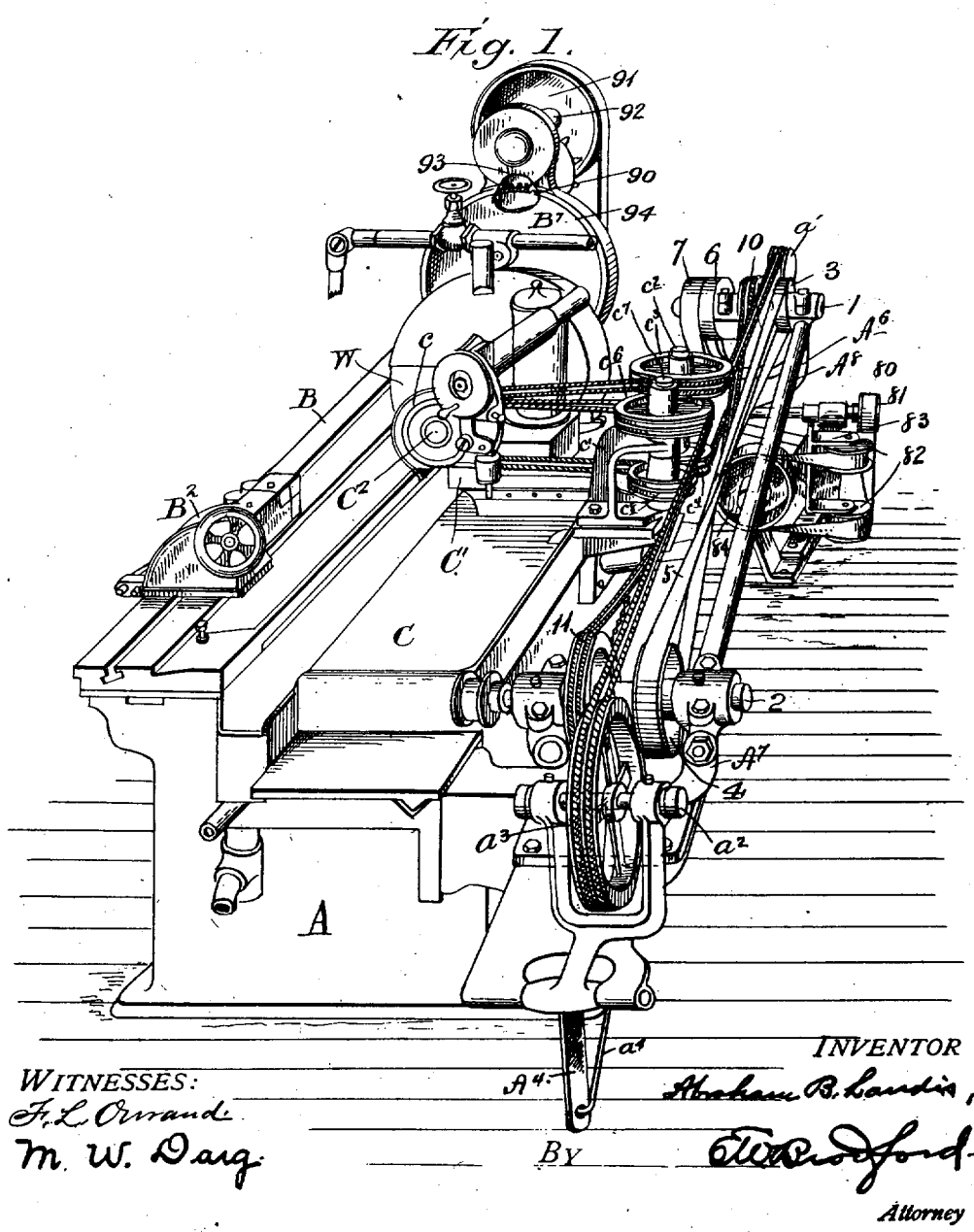

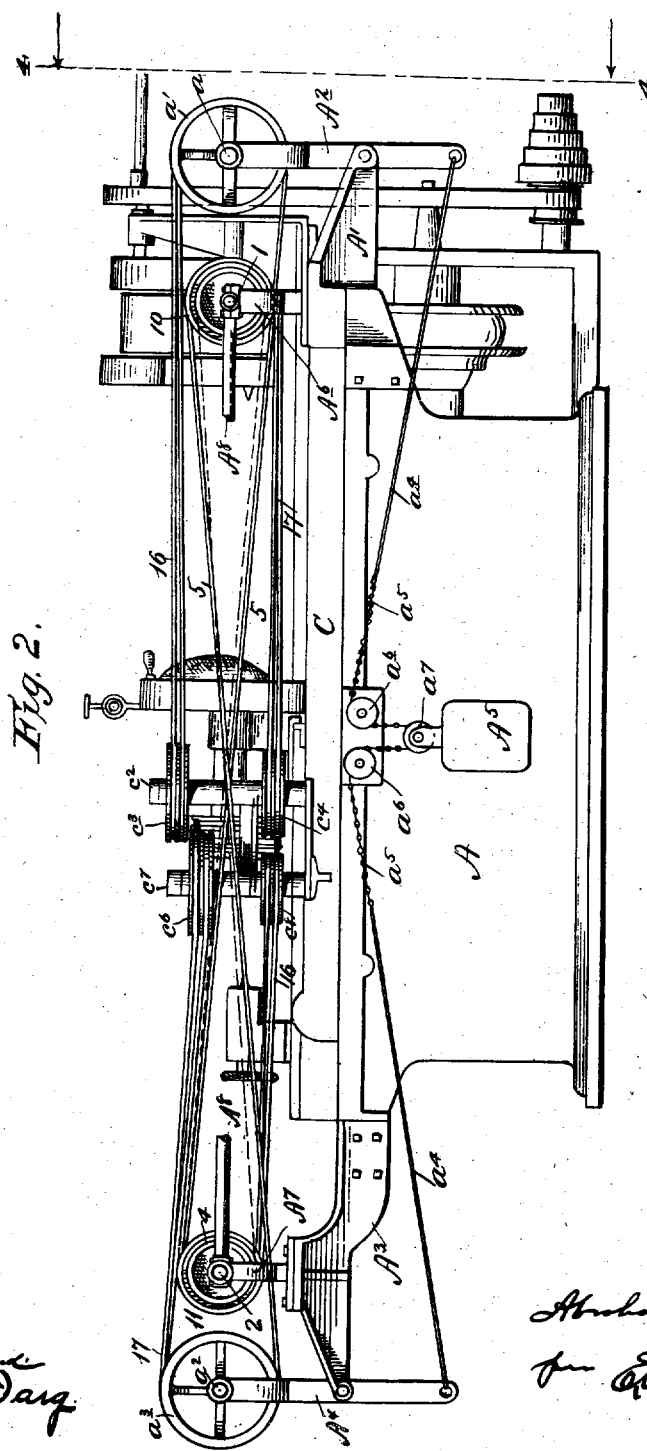

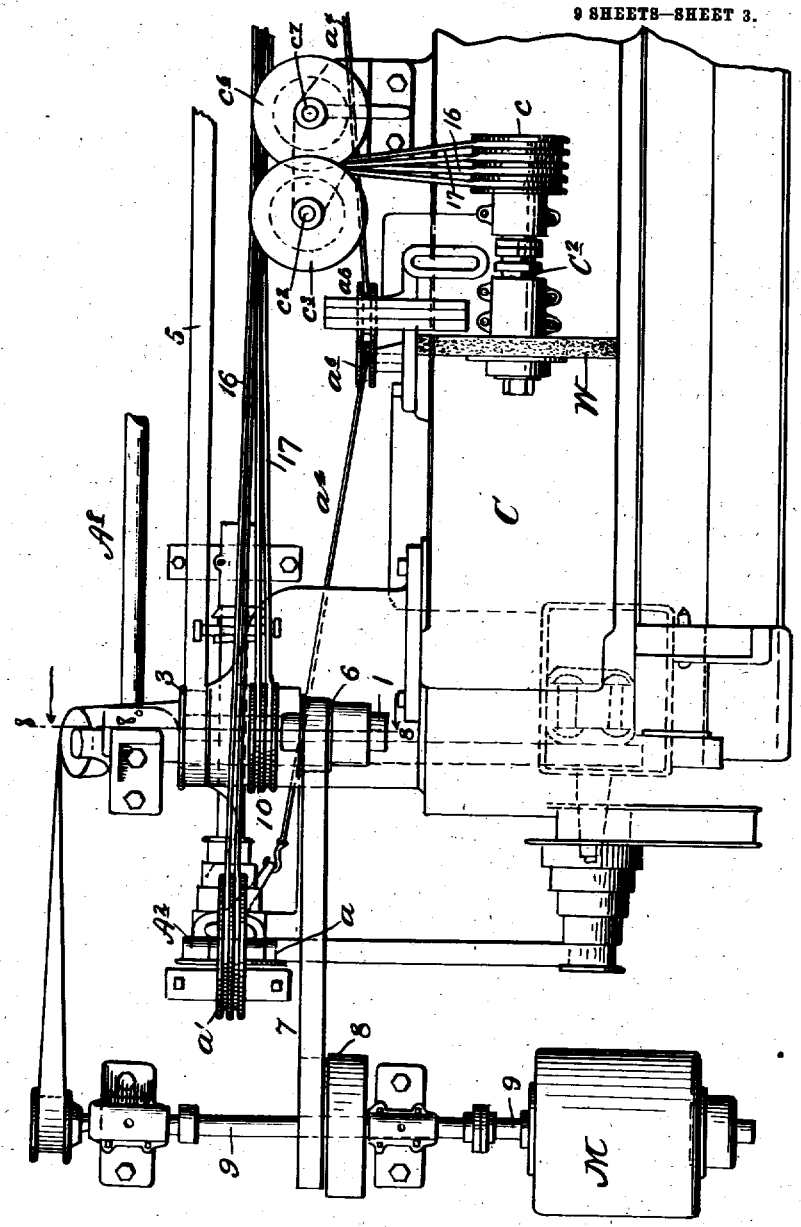

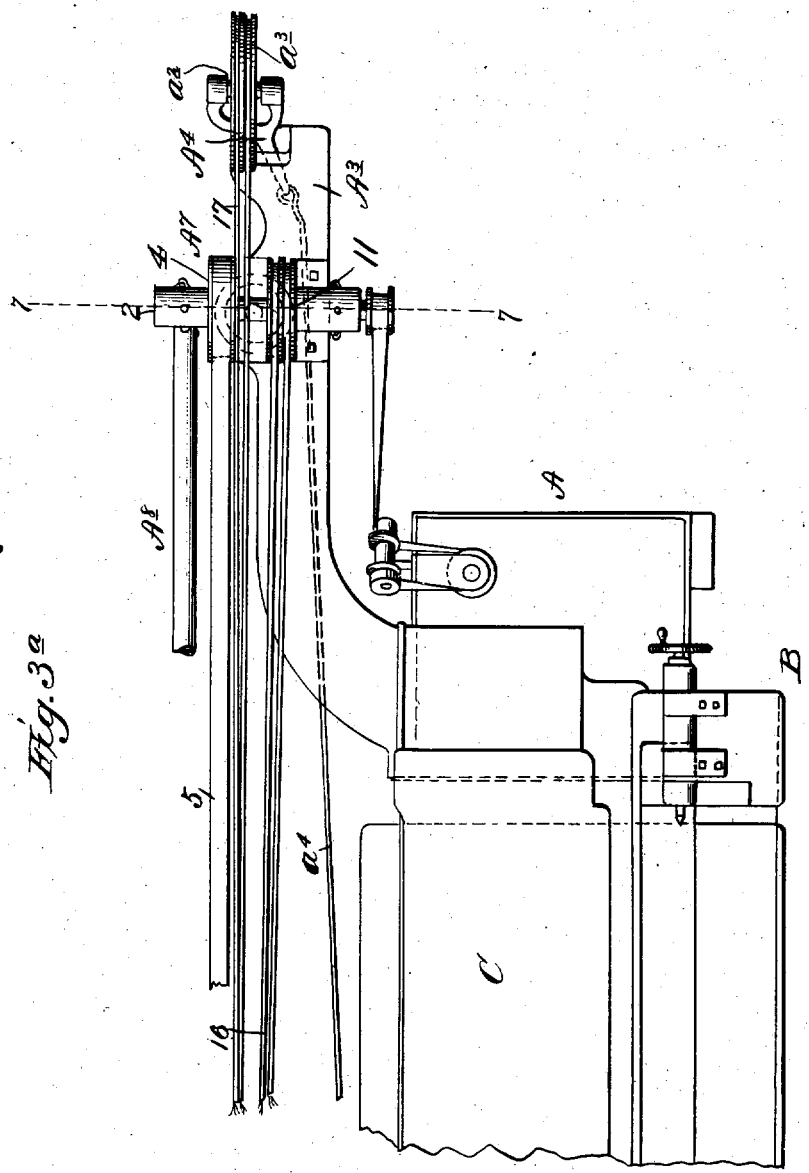

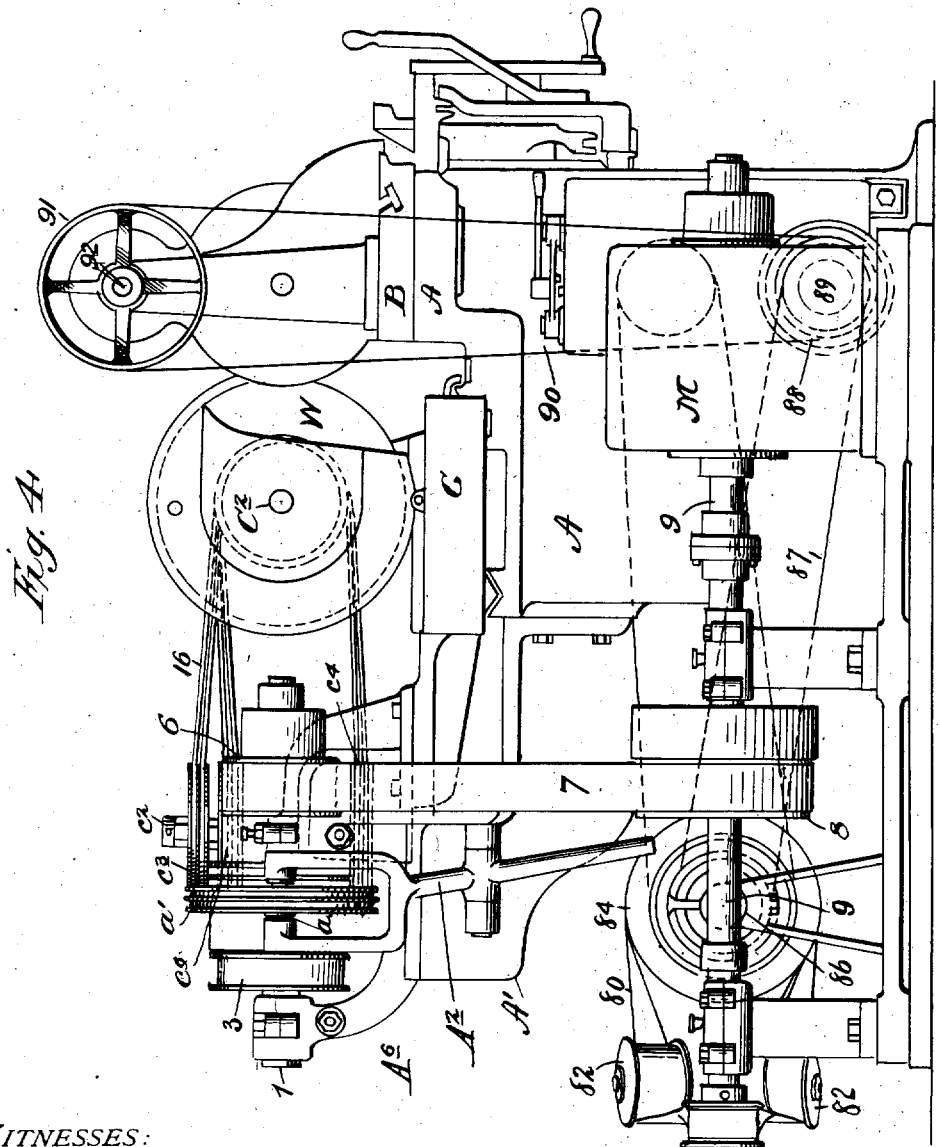

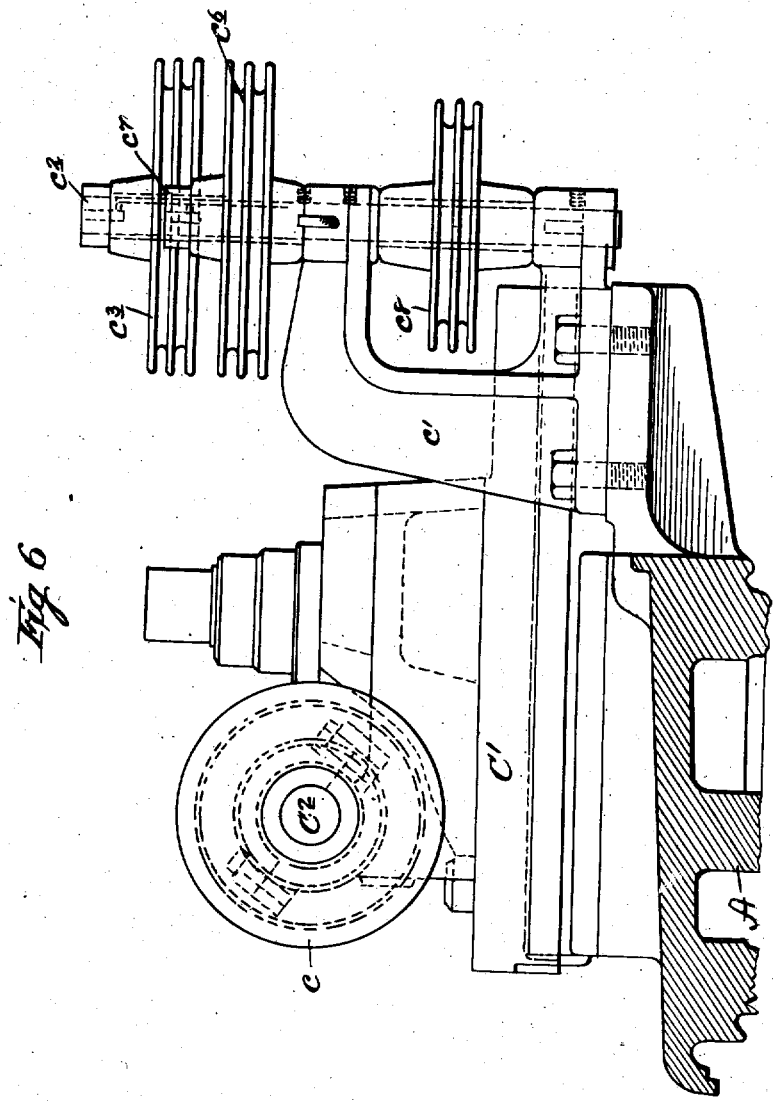

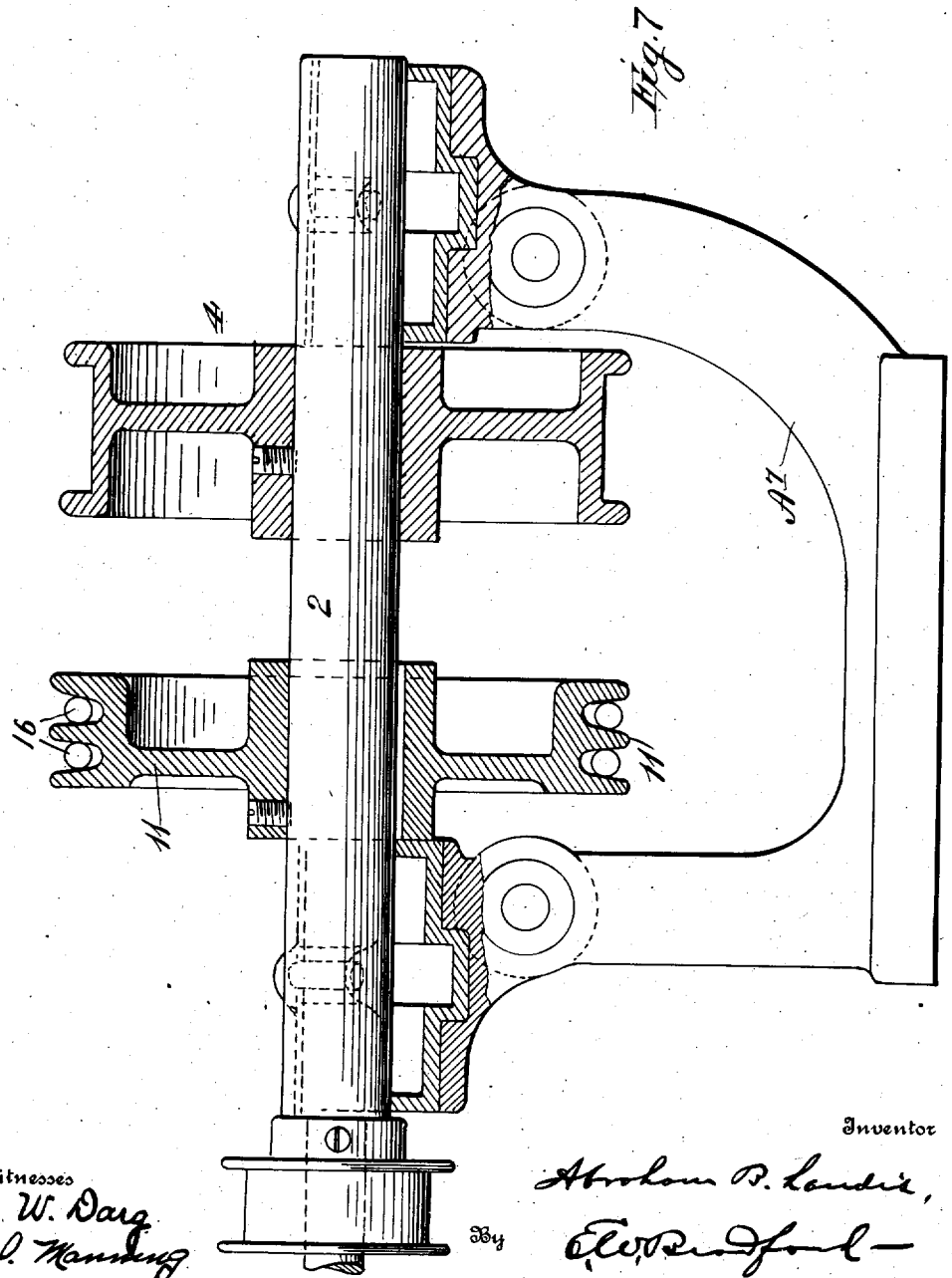

A. B. LANDIS.
GRINDING MACHINE.
APPLICATION FILED APR. 26, 1906.

1,018,392.

Patented Feb. 20, 1912.
9 SHEETS—SHEET 9.

UNITED STATES PATENT OFFICE.

ABRAHAM B. LANDIS, OF WAYNESBORO, PENNSYLVANIA.

GRINDING-MACHINE.

1,018,392.  Specification of Letters Patent.  Patented Feb. 20, 1912.

Application filed April 26, 1906. Serial No. 313,784.

*To all whom it may concern:*

Be it known that I, ABRAHAM B. LANDIS, a citizen of the United States, residing at Waynesboro, in the county of Franklin and State of Pennsylvania, have invented certain new and useful Improvements in Grinding-Machines, of which the following is a specification.

The object of my said invention is to provide a grinding machine, the driving mechanism whereof for all its parts shall be mounted directly upon the machine, making a self-contained drive and obviating the use of overhead shafting and belting, and it consists in an endless belt mounted upon stationary driving pulleys mounted on the frame of said machine and connected with the traveling grinding wheel carriage in such a manner as to permit said carriage to travel freely to traverse the work and the slider to move freely toward and from the work without affecting the tension or the operation of said gear, all as will be hereinafter more fully described and claimed.

Figure 8:
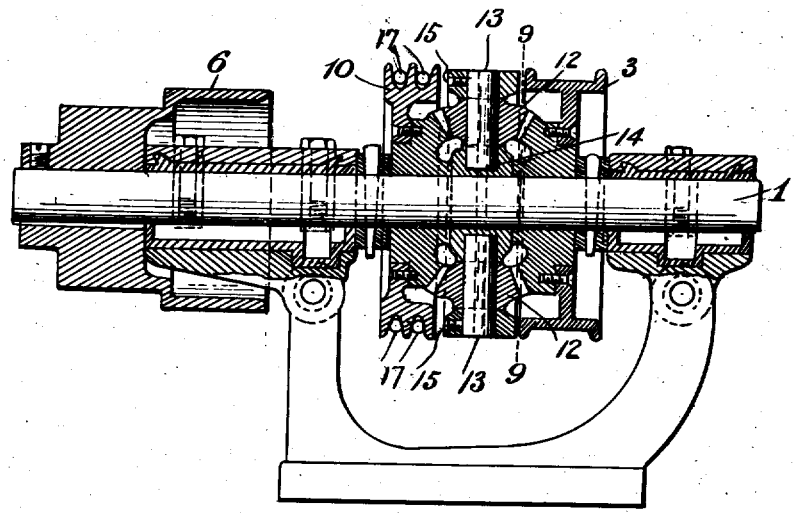
Figure 9:
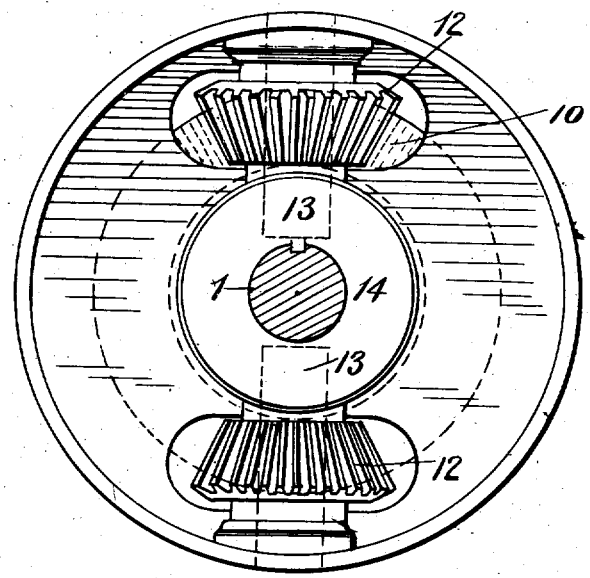

Referring to the accompanying drawings which are made a part hereof and on which similar reference characters indicate similar parts, Figure 1 is a perspective view of a machine embodying my said invention showing the rear and top thereof, Fig. 2 a rear elevation of the same, Fig. 3 a top or plan view of the right-hand end of the machine, as shown in Fig. 2, but viewed from its opposite side, Fig. 3ª a similar view of the left-hand end, Fig. 4 an end elevation as seen when looking in the direction indicated by the arrows on the dotted line 4—4 in Fig. 2, Fig. 5 a rear elevation of the centrally mounted grooved pulleys on the carriage, Fig. 6 a side elevation of the same, Fig. 7 a cross section on the dotted line 7—7 in Fig. 3ª on an enlarged scale, Fig. 8 a similar view on the dotted line 8—8 in Fig. 3, and Fig. 9 a section on the dotted line 9—9 in Fig. 8, on an enlarged scale.

In said drawings the portions marked A represent the main bed of the machine, B the work supporting table and C the grinding wheel carriage.

The main bed A is a casting of suitable form to support the several other parts and needs no special description.

The work-supporting table B has the head-stock B' and foot-stock B² mounted thereon and the several parts carried thereby are driven and arranged to support and drive the work in the usual or any appropriate manner. As shown, the head-stock is driven from the main driving shaft 9 through a belt 80 running from a pulley 81 on its outer end around idler pulleys 82 set in a horizontal position in a suitable frame 83 and passing over a cone pulley 84 on a counter-shaft 85 set in suitable bearings 86 at right-angles with said shaft 9. A belt 87 runs from one face of the conepulley 84 to a cone-pulley 88 on another counter-shaft 89 on the opposite side of the machine, and another belt 90 runs from said cone-pulley 88 to a pulley 91 on the shaft 92 on the top of the head-stock structure. A gear wheel 93 on the opposite end of said shaft 92 meshes with a gear on the periphery of the face-plate 94 of the head-stock.

The grinding wheel carriage C is mounted to travel back and forth on the track provided therefor on the main bed of the machine and has a transverse slider C' mounted thereon, carrying the grinding wheel base and grinding wheel W in the usual manner. Said grinding wheel W is mounted upon a spindle C² having a grooved pulley $c$ mounted thereon to receive the ropes constituting the belt drive. On the rear side of said carriage C are mounted brackets $c'$ in which are provided journal bearings in which vertical shafts $c^2$ and $c^7$ are mounted, said vertical shafts having a grooved pulley $c^1$ and $c^6$ respectively at the upper end and a similar pulley $c^4$ and $c^8$ respectively at the lower end. A bracket A' projects from one end of the machine, in which is mounted a pivoted yoke A² carrying the shaft $a$, on which is mounted a grooved pulley $a'$. On the opposite end of the frame is secured a bracket A³ having a pivoted yoke A⁴ thereon, which has a shaft $a^2$ at its upper end, on which is mounted a grooved pulley $a^3$. The lower ends of said yokes A² and A⁴ are joined by rods $a^4$ and a flexible chain $a^5$ which connects the inner ends of said rods and passes over idle pulleys $a^6$ on the rear of the bed and under a pulley $a^7$ mounted on a shaft in a bracket on the top of a weight $A^5$, which is thus suspended on said chain. A yoke-shaped bracket $A^6$ is mounted on the top of bracket $A'$ and has bearings formed in its upper end, in which is mounted a shaft 1. A similar bracket $A^7$ is mounted on the top of bracket $A^3$ at the other end of the machine and has bearings at its upper end, in which is journaled a shaft 2. A distance rod $A^8$ is mounted between said brackets $A^6$ and $A^7$ to brace them apart and take the strain caused by the pull on the belts mounted thereon.

On shaft 1 is mounted a belt pulley 3 and on shaft 2 is mounted a belt pulley 4, said pulleys 3 and 4 being connected by a driving belt 5, crossed between said pulleys to drive said shafts 1 and 2 in opposite directions. Another pulley 6 is mounted on the opposite end of said shaft 1 and is geared by belt 7 with a pulley 8 on a shaft 9 driven by a motor M, mounted at the end of the machine. A grooved pulley 10 is mounted upon said shaft 1 and a grooved pulley 11 upon shaft 2. Pulleys 3 and 10 on shaft 1, are mounted loosely and connected by a differential gear comprising beveled gears 12, mounted in mortises in a disk 14 upon radial studs 13. Said disk 14 is secured upon said shaft 1 between said pulleys 3 and 10 and said studs 13 are secured in place by screws 15 extending through screw-threaded perforations in the rim of disk 14 against the sides of said studs. By means of this arrangement, the drive upon each shaft 1 and 2 through the belt 5 is made even, regardless of the travel of the grinding wheel carriage in either direction, as will be presently more fully described.

There are two rope belts 16 and 17, each of which are doubled so that two or more strands run parallel and together. Belt 16 is mounted on pulley $a'$ and passes over the horizontal pulley $c^3$ on the upper end of the vertical shaft $c^2$, from thence over the top of pulley $c$ of the grinding wheel spindle $C^2$, then back around pulley $c^8$ on the lower end of shaft $c^7$, thence toward the opposite end of the machine and under and around pulley 11 on shaft 2 and back to the underside of pulley $a'$. Belt 17 is mounted upon pulley $a^3$ runs to pulley $c^6$ on the upper end of vertical shaft $c^7$, thence passes down over and around the pulley $c$ of the grinding wheel spindle $C^2$ back around pulley $c^4$ on the lower end of vertical shaft $c^2$, thence to the other end of the machine and around pulley 10 on shaft 1, thence back to the underside of pulley $a^3$. It will be understood, of course, that in thus tracing the course of these belts, it is not intended to mean that either belt begins or ends at any particular point, inasmuch as they are both endless belts and each are mounted in an identical manner to drive upon the pulley $c$ of the grinding wheel spindle from the shafts 1 and 2 respectively, the power being transmitted to shaft 1 by the belt 7 from the motor shaft 9 and from shaft 1 to shaft 2 through the belt 5 and transmitted from said shafts 1 and 2 to the grinding wheel spindle by means of the belts 16 and 17, as just described. By this arrangement a drive for the grinding wheel spindle is provided which is not only entirely contained upon the machine, but one in which the strain is equalized in both directions upon the mechanism which drives the grinding wheel carriage to traverse the grinding wheel across the work, permitting said carriage to travel back and forth without interfering with the true adjustment and accurate work of the grinding wheel. The pivoted yoke-frames $a^2$ and $a^4$ carrying the pulleys $a'$ and $a^3$ being connected by the flexible connection to the weight $A^5$, operates to hold the rope belts under a uniform tension regardless of the travel of the slider carrying the grinding wheel toward and from the work, and the compensating gear on shaft 1, above described serves to allow either belt 16 or 17 to vary in speed that degree necessary to compensate for the motion of the carriage in whichever direction it may be moving, as will be readily understood.

It will be observed that each endless belt from the ends of the machine to the grinding wheel can be used single or in multiple to any number of strands desired. As here shown the strands or ropes are double but the number can readily be increased to 3, 4, 5 or any number necessary for the transmission of such power as required by different sized machines without making said rope heavier than would be used on small machines, which enables the same flexibility and ease of operation to be maintained in all machines.

Having thus fully described my said invention, what I claim as new and desire to secure by Letters Patent, is:—

1. A grinding machine comprising the traveling carriage carrying a driven part, a power shaft, a counter shaft at each end of the machine geared to and driven by said power shaft, and a rope belt running from a pulley on each of said countershafts around an idler adjacent to the driven part on said carriage, around a pulley on said driven part, back around another idler and then over a pulley on a yieldingly supported frame at the other end of the machine, substantially as set forth.

2. In a grinding machine, the combination, of the bed, the traveling carriage, the slider carrying the grinding wheel mounted thereon, a drive pulley on the spindle of said grinding wheel, a main power shaft, counter-shaft at each end of the machine, a belt connecting said counter shafts and another connecting them with said power shaft, a second pulley on each of said countershafts, a belt running from each of said pulleys toward the center of the machine and passing over an idler adjacent to the pulley on the grinding wheel spindle, then over said pulley on said grinding wheel spindle, then back over another idler and then to the other end of the machine and over a pulley supported on a yieldingly mounted frame, substantially as set forth.

3. In a grinding machine, the combination, of the bed, the traveling carriage, the slider mounted thereon with the grinding wheel spindle mounted in bearings carried thereby, a pulley on said grinding wheel spindle, a main power shaft, a counter-shaft at each end of the machine, gearing connecting each of said counter-shafts to said power shaft, another pulley on each of said counter-shafts, a rope belt running from each of said pulleys over a suitably located idler to the pulley on the grinding wheel spindle and then to a pulley on a yieldingly held frame at the opposite end of the machine, the pulley on the counter-shaft that is belted direct to the power shaft being connected to said shaft and to the pulley by which it is belted to the other counter-shaft by a differential gear, substantially as set forth.

4. In a grinding machine, the combination, of the bed, the carriage, the slider on said carriage, the grinding wheel spindle journaled in bearings on said slider, a power shaft, a counter-shaft at each end of the machine, one of said counter-shafts being belted to said power shaft and then to the other counter-shaft by a crossed belt, another pulley on each of said counter-shafts, a belt running from each of said pulleys to the pulley on the grinding wheel spindle over suitably located idlers, and then to a pulley at the other end of the machine mounted on a yieldingly supported frame, and a differential gear mounted on one of the counter-shafts between the pulley receiving the driving belt and the pulley carrying the belt running to the grinding wheel spindle, which differential gear connects said pulleys to the shaft and to each other, substantially as set forth.

5. In a self-contained drive for a grinding machine comprising belts mounted upon pulleys supported upon the machine and running over a pulley on the grinding wheel spindle and over yieldingly held pulleys to maintain tension and permit lengthening and shortening of the belt to accommodate the movements of the slider, the combination of the driving belts mounted upon driven shafts of a differential gear mounted upon one of said shafts between the pulleys thereon carrying the belt for transmitting motion to its companion shaft and the pulley carrying the belt for transmitting motion to the grinding wheel spindle, said differential gear connecting said pulleys to each other and to said shaft, substantially as set forth.

6. In a grinding machine, the grinding wheel carriage adapted to be traversed, driving shafts located at each end of the machine, pulleys mounted thereon, separate belts connecting each of said pulleys with the pulley on the grinding wheel spindle, and means for driving the same without effecting the traversing mechanism of said carriage in either direction regardless of the amount of power transmitted, substantially as specified.

7. In a grinding machine, the grinding wheel carriage adapted to be automatically traversed, driving shafts at each end of the machine having pulleys, an endless belt connecting each of said pulleys with the pulley on the grinding wheel spindle, said shafts on the ends of the machine being differentially connected to their driving power, whereby any variations in the movement of said carriage may be compensated for without any influence on the traverse drive in either direction or any effect on the power transmitted to said grinding wheel spindle regardless of the amount of power transmitted, substantially as specified.

8. In a grinding machine, the grinding wheel carriage adapted to be automatically traversed, driving shafts located at each end of the machine from each of which an equal amount of power is transmitted to the grinding wheel, and gearing connecting said driving shafts to the grinding wheel spindle comprising compensating means by which the power applied to said grinding wheel exerts the same force in both directions eliminating any influence upon the traversing mechanism of said carriage, substantially as set forth.

9. In a machine of the character described, the combination of a traversing carriage, a slider thereon, a part to be driven mounted on a shaft journaled in bearings on said slider, driving shafts at each end of the machine having pulleys, and endless belts connecting each of said pulleys with the pulley on the shaft journaled on the slider, each of said belts running to the end of the machine opposite from its driving shaft and there mounted upon a yieldingly supported idler pulley, substantially as set forth.

10. In a machine comprising a traversing carriage with a transverse slider thereon carrying a part to be driven, the combination of the main driving shaft, two other driving shafts one located at each end of the machine, a belt connecting the main driving shaft with one of said other driving shafts, a belt connecting the driving shafts at each end of the machine, an endless belt running from a pulley on the driving shaft at each end of the machine to a point adjacent to the slider on the carriage, there over idler pulleys and around a pulley on the shaft of the part to be driven on said slider, and from thence to the opposite end of the machine and over a yieldingly supported idler pulley, substantially as set forth.

In witness whereof, I have hereunto set my hand and seal at Waynesboro, Pennsylvania, this 9th day of April, A. D. nineteen hundred and six.

ABRAHAM B. LANDIS. [L. S.]

Witnesses:
MERTA RUSSELL,
ALF. N. RUSSELL.